March 24, 1925.
R. BENNETT
1,530,641
DIRECTION INDICATOR FOR MOTOR VEHICLES
Filed Feb. 21, 1922  2 Sheets-Sheet 1
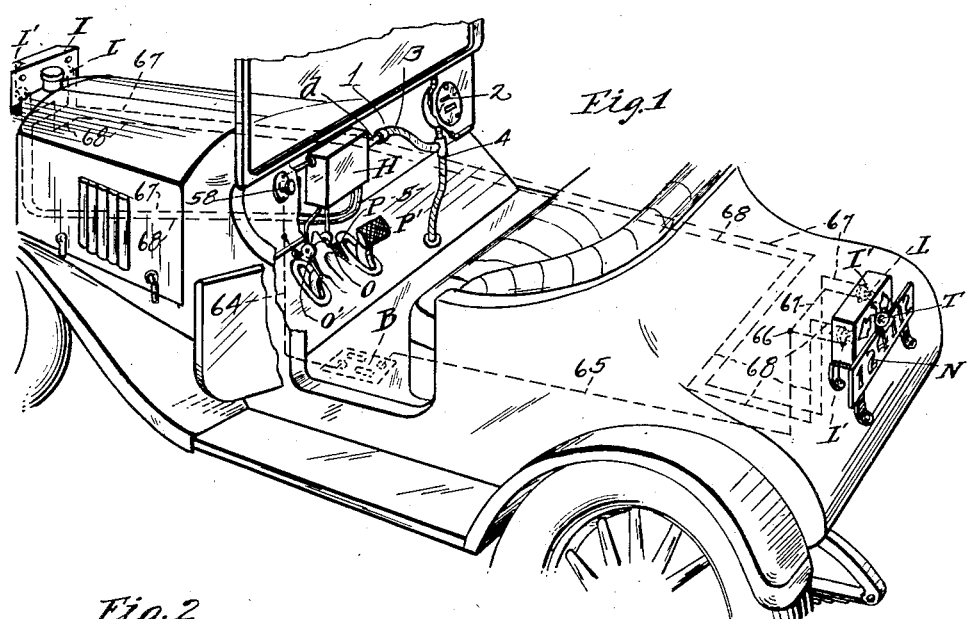
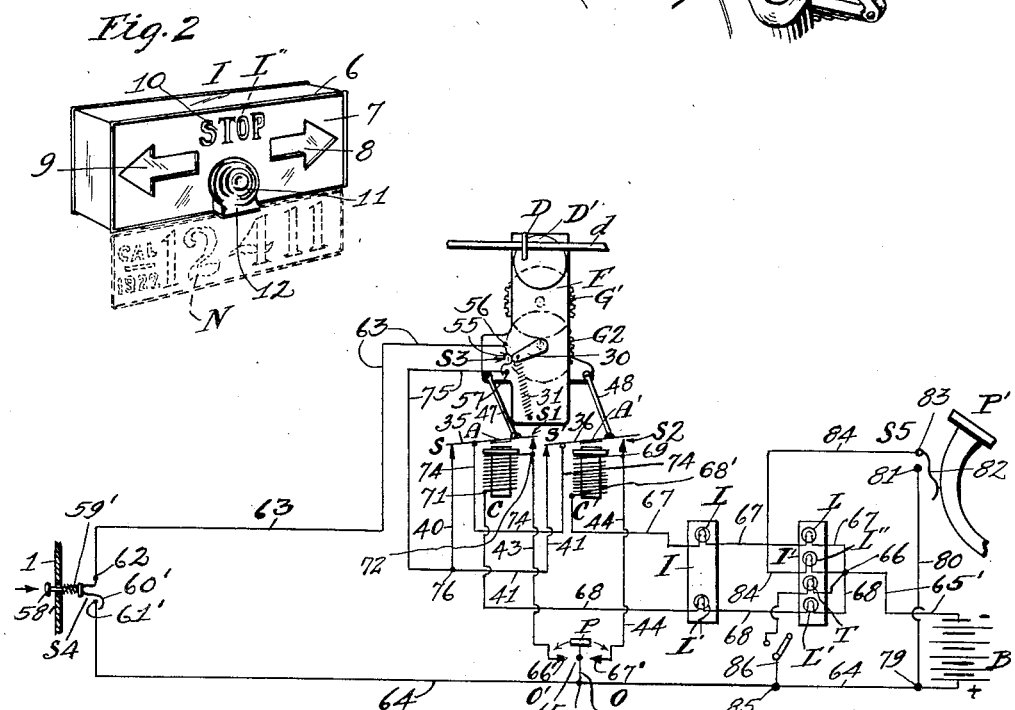
INVENTOR.
Ralph Bennett
BY
ATTORNEYS March 24, 1925. 1,530,641
R. BENNETT
DIRECTION INDICATOR FOR MOTOR VEHICLES
Filed Feb. 21, 1922  2 Sheets-Sheet 2

INVENTOR.
Ralph Bennett,
BY
ATTORNEYS.

Patented Mar. 24, 1925.

1,530,641

UNITED STATES PATENT OFFICE.

RALPH BENNETT, OF LOS ANGELES, CALIFORNIA.

DIRECTION INDICATOR FOR MOTOR VEHICLES.

Application filed February 21, 1922. Serial No. 538,203.

*To all whom it may concern:*

Be it known that I, RALPH BENNETT, a citizen of the United States, and a resident of Los Angeles, in the county of Los Angeles and State of California, have invented new and useful Improvements in Direction Indicators for Motor Vehicles, of which the following is a specification.

This invention relates to direction indicators for motor vehicles, and the main object is to provide a thoroughly comprehensive and economical mechanism adapted to be employed on and for indicating the direction of motor vehicles, and contemplates the provision of a mechanism which may be manually set to indicate a turn in a given direction or a stop of the vehicle, and automatically released for discontinuing the signals after the vehicle has traveled a predetermined distance.

A further object is to provide a signalling mechanism for motor vehicles adapted to be operatively connected with some distance measuring device of the vehicle, such for instance, as a speedometer or the running gear, whereby when the signals have been manually set prior to a change in the direction or the stopping of a vehicle, the mechanism may be restored to normal and the signals discontinued after the vehicle has traveled a predetermined distance.

A further object is to provide separate right and left turn and stop signals, electrically connected for independent operation, and arranged for automatic release, and provided additionally with a manual releasing mechanism whereby when the signals are set for a given change in direction, the signals may be reversed in the event that a change to a different direction is contemplated or desired.

Another object is to provide in combination with the electric system of a motor vehicle, a set of electrically illuminated signals in which are associated together right and left turn signals, the ordinary stop signal, and such other lights or signals as, for instance, the tail lamp of an automobile, as may be desired.

Still other objects may appear as the description progresses.

In the accompanying drawings I have shown one practical embodiment of my invention, subject to modification within the scope of the appended claims without departing from the spirit of my invention.

In the said drawings:

Fig. 1 is a perspective view of an automobile equipped with my improved signalling mechanism.

Fig. 2 is a perspective view of one of the signal units.

Fig. 3 is a circuit diagram showing the electric connections of my improved mechanism.

Figure 4:
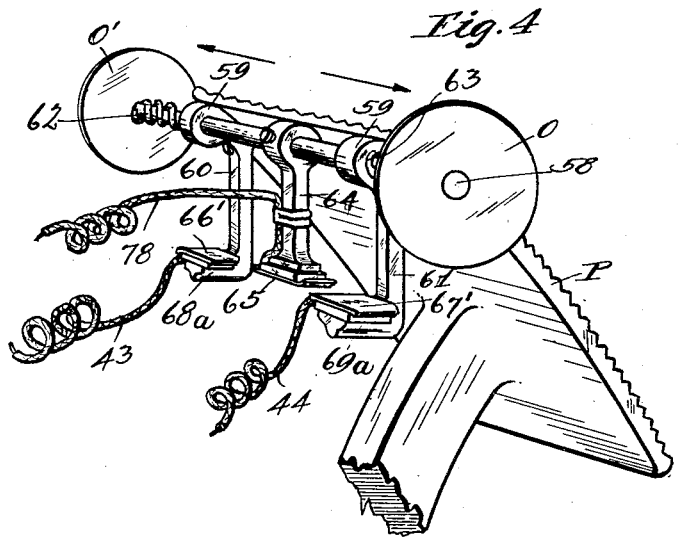
Fig. 4 is a perspective view of the foot operated mechanism, whereby the signals are selectively displayed.

Referring particularly now to Fig. 1, I have shown an ordinary form of pleasure vehicle equipped with my mechanism, on which signal units I and I' are mounted respectively, at the front and rear ends as units, and each of which includes lamps L and L' for indicating right and left turns respectively, a stop signal lamp L'' and the rear unit provided with a tail lamp T. License number plates N usually carried by automobiles, may be suitably attached to and depended from the bottom of the signal units I and I', but this is not material to my invention.

The operating mechanism for my signal means is mounted on the dash-board 1 and enclosed by a housing H, and as shown, is operatively connected with a speedometer 2 by means of a branch flexible cable 3 suitably connected with the main speedometer cable 4. On the dash-board 1 I also provide a manually operable release switch S⁴, the purpose of which will be hereinafter described, and on the clutch pedal P which extends through the floor 5 of the automobile, I provide a pair of operating members O and O' whereby the right and left turn signals may be independently operated by shifting the members O and O' with the foot of the operator, as hereinafter more fully explained.

The signal units I and I' serve to house the lamps L, L', L'' and T which illuminate the right and left hand turn signals, the stop signal, and the tail signal, and include a metallic housing 6 on the front 7 of which transparent openings 8 and 9 are formed in front of the lamps L and L' respectively, so that when said lamps are energized, the intention of an operator to turn to the right or left may be so indicated. The front 7 also may have the word "Stop" formed thereon with transparent openings, as at 10, and in the center of the indicator front 7, I may also suitably mount the usual form of tail-light lens 11 in front of lamp T.

While the details of these signal units may be as stated, it is understood that they are subject to modification and change and are shown merely in a preferred or suitable form for use.

It will also be understood that the portion 12 of the housing 6 which retains the tail light lens 11 in place may be provided with an opening through which light may be reflected against the license number plate N so as to render the said plate visible at night.

Figure 5:
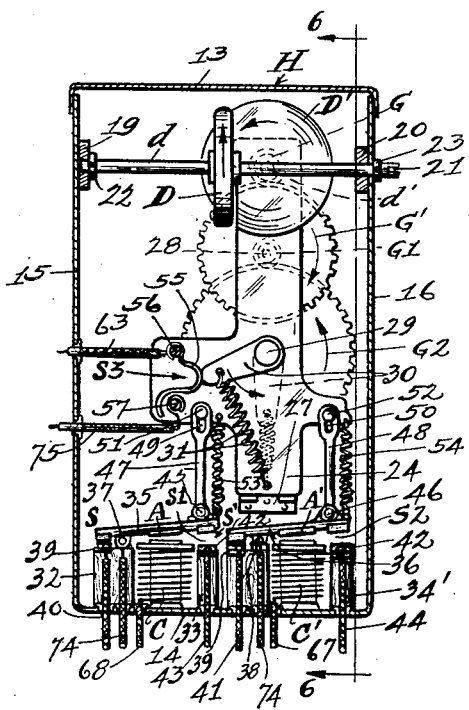
Fig. 5 is a longitudinal section of the operating mechanism and housing.
Figure 6:
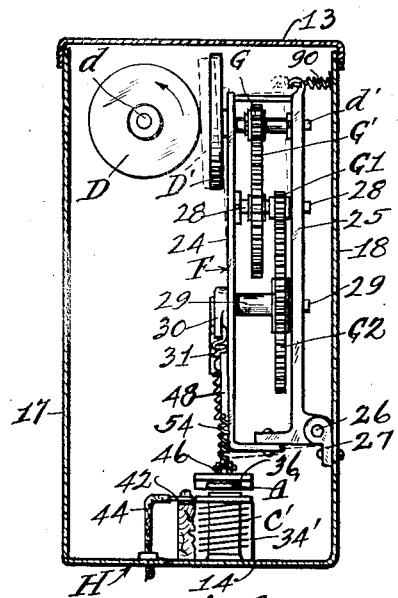
Fig. 6 is a section on line 6—6 of Fig. 5.

Now, referring particularly to Figs. 5 and 6, I will describe in detail the arrangement and structure of the operating mechanism whereby the operation of the indicators I and I' are controlled and affected.

The unit H, as shown on the dash-board 1 of the vehicle, includes a rectangular form of sheet metal housing having a top 13, bottom 14, ends 15 and 16, and sides 17 and 18, and as shown in the drawings, the top 13 may be made removable so as to afford access into the interior of the housing. Mounted longitudinally on the interior of the housing H and journaled in bearings 19 and 20 on the ends 15 and 16 of the housing I provide a drive shaft $d$ which is extended outside the end 16 of the housing, and is notched at 21 so as to be connected with the flexible shaft 3 attached to the speedometer cable.

Shaft $d$ may have set collars 22 and 23 in suitable positions, or as shown, for the purpose of retaining said shaft in operating position. In the interior of the housing I provide a driving disc D which is fixed to the shaft $d$ at a convenient point. Now, also mounted within the housing H, I provide a frame F which has parallel sections 24 and 25 suitably spaced apart and connected together for forming a rigid unit, and said frame is pivoted at 26 on an axis paralleling the drive shaft $d$ to a bracket 27, attached to the side 18 of the housing. A driven shaft $d'$ is mounted on the frame F and journaled in the members 24 and 25 thereof, substantially in the plane of the drive shaft $d$, and at right angles thereto.

The inner end of said driven shaft $d'$ carries a driven friction disc D' which is adapted to engage the periphery of the driving disc D, and midway of the members 24 and 25 of the frame F, the shaft $d'$ is provided with a pinion G. Below the shaft $d'$ and in the vertical plane thereof, I provide a counter shaft 28 which is also journaled at its opposite ends in the frame members 24 and 25, and carries a large gear G' which meshes with the pinion G on shaft $d'$, and also a pinion $G^1$ is carried on said shaft.

Still further downward on the frame F and below shaft 28 I provide a parallel shaft 29 which is also journaled in frame members 24 and 25 and carries a large gear $G^2$ which meshes with and is driven by the gear $G^1$ on shaft 28. The outer end of shaft 29 carries an arm 30 which has a spring 31 attached to the outer end thereof, and said spring is connected at its other end to the lower end of frame member 24, and serves to hold the arm 30 normally downward, as shown by broken lines in Fig. 5.

On the bottom of the housing H I provide a pair of electromagnets C and C'. The electromagnet C is mounted between a pair of insulating blocks 32 and 33 and likewise electromagnet C' is mounted between a similar pair of blocks 34 and 34'. The blocks 32 and 34' carry pivoted bars 35 and 36 respectively, on which armatures A and A' are respectively mounted for engagement with and attraction by the cores of the electromagnets C and C'.

It will be noted that the bars 35 and 36 are extended rearwardly beyond the pivots 37 and 38 of the bars 35 and 36 and switches S and S' are provided at the rear ends of said bars, as follows: Contact plates 39 are provided on the upper sides of blocks 32 and 34 which are connected with wires 40 and 41 respectively, and the rear ends of the bars 35 and 36 are adapted to contact with the plates 39 of said switches when the armatures A and A' of the coils are held upwardly out of engagement with the cores of the coils. Likewise, when said armatures are attracted by the electromagnets, the switches S and S' will be opened. Other switches $S^1$ and $S^2$ are provided at the forward ends of the bars 35 and 37, and are formed by means of contact plates 42 which are attached to the upper sides of blocks 33 and 35, and are connected respectively with wires 43 and 44, so that when the armatures A and A' of the coils C and C' are attracted and engage the cores of the magnets the forward ends of bars 35 and 37 will contact with the plates 42, thereby closing the switch and making a circuit.

The forward ends of bars 35 and 37 are pivotally connected at 45 and 46 respectively, with links 47 and 48 and said links are slotted at 49 and 50 at their upper ends to receive pins 51 and 52 held on the frame member 24. Thus, as either or both of the armatures A and A' are attracted by the electromagnet C and C' and are moved downwardly, the frame F as a unit will be tilted rearwardly in housing H, so that the driven disc D' will engage the periphery of the driving disc D and set the train of gears G, G', G¹, and G² into operation. Springs 53 and 54 may also be employed for connecting the bars 35 and 36 with the frame member 24, so as to cushion the operation of said parts.

Another switch S³ is provided on the frame member 24 and consists of a spring contact plate 55 attached to frame member 24 by means of a terminal screw 56 and balanced so as to be engaged by the outer end of arm 30 when the same is moved in a clock-wise direction. The free end of the contact 55 normally engages a terminal 57 carried on plate 24, and when said plate is engaged by arm 30, it is simultaneously disengaged from terminal 57 for opening the circuit, as hereinafter more fully explained.

Referring now to Fig. 4, I have shown the main signal operating members O and O' in the form of discs mounted on a transverse shaft 58, which is slidably held in bearings 59, 59, formed on brackets 60 and 61, spaced apart and attached to the under side of the clutch pedal P. The portions of the shaft 58 between the bearings 59, 59 and the discs O and O' respectively, carry springs 62 and 63 which serve to restore the shaft 58 and members O and O' to normal position after each operation.

Intermediate the members 60 and 61 I provide an arm 64 which is fixed at its upper end to shaft 58 and carries on its lower end a wiper contact plate 65 which is adapted to make contact alternately with plates 66 and 67 carried on portions 68ª and 69ª respectively, of members 60 and 61, when the members O and O' are moved to the right or left by the foot of the operator.

With reference to Fig. 3, which shows a circuit diagram for my mechanism, it will be noted that the manually operable release switch S⁴ includes a push button 58' which is held normally upwardly by means of a spring 59' and is mounted on the dash board 1 of the vehicle. The inner end of said button presses against a spring contact 60' which makes contact with a terminal 61' so that the circuit will be opened for releasing the mechanism as hereinafter more fully described, when the button 58' is pressed inwardly.

The terminal 62 of contact member 60' is connected by means of a wire 63 with terminal 56 on frame member 24, and terminal 61' of switch S⁴ is connected by means of a wire 64 with the positive side of a battery B, such as is usually provided on an automobile. The negative side of battery B has a common wire 65' leading therefrom which connects at 66 with two branch wires 67 and 68 leading respectively to the lamps L, L of signal units I and I', and L', L', of said signal units, and the extreme end of wire 67 connects at 68' with one end of coil C' which serves to regulate the operation of the right hand turning signal. The other end of coil C' connects at 69 with a wire 44 which leads to the contact plate 67' on member 61, which is operated by member O. Likewise, wire 68 leads to and through lamps L', L', of indicator units I and I' and thence to and is connected at 71 with one end of a coil C, while the other end of said coil is connected at 72 with a wire 43 which leads to contact plate 66' on operating member O'.

The armature bars 35 and 36 of the coils C and C' are conductors and convey the current between the switches S and S¹ and S' and S², respectively, and said bars are connected at their pivot points 37 and 38 respectively with the opposite ends of a wire 74. Now, the terminal 57 on frame member 24 is connected by means of a wire 75 with the rear ends of switch bars 35 and 36 at switches S and S', the wire 75 being split at 76, and branch wires 40 and 41 leading from this point to the switches S and S' respectively. Wire 64 is connected at 77 with a branch wire 78 which leads to contact plate 65 on member 64 of the operating device. This completes the electric circuit for the right and left turn signal operating mechanism, and the connections for effecting the operation of the stop signal and also for energizing the tail light T are as follows.

The positive wire 64 from battery B is connected at 79 with a wire 80 which leads to a terminal 81 of a stop signal switch S⁵, and said switch includes a spring contact plate 82 which is adapted to be depressed by break pedal P' for making contact with terminal 81. The other terminal 83 of switch S⁵ is connected by means of a wire 84 with the stop signal lamp L'', and the point of connection 66 with the negative wire 65', thus completing the circuit for the stop signal. The tail lamp T connects at 85 with positive wire 64 from battery B with a wire 86 leading to lamp T and point 66 on negative wire 65', thus completing the tail signal circuit.

Now, the operation of the device is as follows: Assuming that the mechanism is in normal condition, the frame F in the housing H will be so disposed that the driving disc D and driven disc D' will be disengaged and the mechanism of this unit therefore inoperative. Now, assuming that it is the desire of the operator to indicate and make a right hand turn, the member O on the clutch pedal P will be moved to the right by the foot of the operator, so as to make contact between plates 65 and 69ª on members 64 and 61, respectively. When this is done, current flows from battery B through wire 64, plates 65 and 67', wire 44, coil C', thus energizing the magnet wires 67 and 65, lamps L, L, of indicators I and I', back to battery, and completing the right turn signal lighting circuit.

Now, the energization of the magnet C' attracts the armature A' of bar 36 and crosses switch S², whereupon current flows from wire 44, through contact bar 36 and wire 74, to contact bar 35, thence through wires 40 and 75, to terminal 57 of switch S³, which is normally closed. Current then flows through switch S³, wire 63, switch S⁴ and wire 64, back to battery. Sumultaneously with the closing of switch S², the switch S' is opened so that no current may pass the switch S'.

Now, this much of the operation having been accomplished, which of course, is instantaneous, the operating member O may be released and the signals light and continue to burn until the arm 30 has, in its rotation with shaft 29 engaging the contact plate 55 of switch S³, opened the circuit between the end of said plate and terminal 57, whereupon all circuits will again be in normal condition and the mechanism reset to normal position.

Now, it will be understood from the description of the mechanism shown in Figs. 5 and 6, that when the armature A' is attracted by the magnet C', the connection between bar 36 and frame member 24 serves to tilt the frame F rearwardly in the housing H as a unit, so that the driving disc D on shaft d will engage the driven disc D' and set the train of gearing on said frame into operation, and the operation thereof serves to rotate the arm 30 for the purpose described.

When the predetermined distance of the vehicle has been traveled, depending upon the ratio between the operating mechanism and the speedometer, the opening of switch S³ normalizes the circuit and the armature A' is released by the magnet C', whereupon the frame F is restored to normal position by means of a spring 90 connected with the upper end of said frame and with the side of housing H. In this connection it will be understood that the slotted connection of the links 47 and 48 with frame member 24 permit of the independent operation of the solenoids C and C' so that the operation of one of the bars 35 and 36 will not effect the operation of the other.

Now, if a left hand turn is contemplated or desired, the foot of the operator is moved against and serves to move the member O' to the left, so as to make contact between plates 65 on members 64, and 66 on member 60, whereupon current flows through positive wire 64 from battery, plates 65 and 66', wire 43, coil C, wire 68, lamps L', L' of indicators I and I', and wire 65 back to battery, thus completing the circuit of the magnet C and the left hand turn lamps of the indicators. Simultaneously with the energizing of the magnet C, the switch S¹ is closed and switch S is opened by the attraction of the armature A to the magnet C, and currenet flows through wire 43, switch S¹, bar 35, wires 40 and 75 to terminal 57, thence through switch S³, wire 63, switch S⁴, and wire 64, back to battery.

The operation of the mechanism in housing H for a left hand turn is identical for that of a right hand turn, but the frame F is tilted by the link 47 and armature A, instead of by link 48 and armature A' as in the case of right, and the switch S³ is opened by arm 30 after a predetermined distance of the vehicle has been traveled.

It will be understood that in the event that the operator desires, he may cancel the signal by the depression of button 58' of switch S⁴, which serves to open said switch and break contact between terminals 60' and 61', whereupon all signals will be normalized and the operation for a proper signal may be made by operating either of the members O or O' as before, depending upon the direction contemplated.

At any time after the operation of either members O or O' for indicating a turning signal, and prior to the operation of the distance switch S³, the signals may be reversed from right to left, or vice versa, by the operation of members O and O'. For instance, if a right hand turning signal has been set by the operation of member O, and after a short distance the operator decides to turn in an opposite direction, he may reverse his signals by operating member O' which will open the circuit of the right hand signal and close the circuit of the left hand signal. Following this condition, and assuming that the right hand turning member O' has been operated for setting up a right hand turning signal, the current flows as hereinbefore described, through wires 64 and 44, arm 36, wire 74, arm 35, wires 40 and 45, to the switch S³, and from thence through wires 63 and 64, to battery, and also the circuit of the magnet C' and lamps L, L, is closed so that these elements will be energized.

It will be understood, of course, that the operation of either member O or O' for setting the signals is but momentary and only necessary for the purpose of closing switch S², but the closing of switches S¹ and S² by the attraction of armatures A and A' and the members O and O' may be released immediately after their operation and will be restored by means of the springs 62 and 63 to normal position, and contact broken between plates 65 and 67' when member O is operated. This however, does not open the circuit of the magnet C' or the lights L, L, for the reason that the circuit is provided through switch S², bar 36, wire 74, bar 35, wires 44 and 75, switch S³, wires 63 and 64, and switch S⁴ to the positive side of the battery, and wires 67 and 65' to the negative side of the battery.

Now, at this point the operation of member O' for setting up a left hand turning signal will make contact between plates 65 and 66 and energize the magnet C. This will serve to close switch S¹, open the switch S, open switch S², and close switch S', whereupon the current flows from the negative side of battery through wires 65' and 68, magnet C, switch S¹, bar 35, wires 40 and 75, switch S³, wires 63, switch S⁴, and wire 74 to battery.

By reference to Figs. 5 and 6, it will be observed that the driving disc D may be adjusted in its position on shaft $d$ so as to vary the speed of the operating mechanism, that is, the disc D may be moved closer to or further away from the center of driven disc D' than shown for the purpose of varying the speed of the driven mechanism, and this adjustment and variation will also vary the distance which the vehicle will travel before the switches are automatically operated for de-energizing the signals.

The operation of the stop signal may be accomplished by the depression of the break pedal P', which engages the spring contact at 2 and closes the circuit of switch S⁵, whereupon current flows from positive side of battery, through wires 64 and 80 to switch S⁵, and from thence through wires 84 and 65 to negative side of the battery. The tail light signal is continuously energized by its circuit including wires 64, 86 and 65'. Other opposite terminals of battery B' and the switch may be interposed in the tail light circuit, as usual, but such is not properly a part of my invention.

What I claim is:

1. In a vehicle indicator a vehicle, a signal thereon for indicating a change in movement of the vehicle, means for operating said signal to give such indication, and means connected with a moving member on said vehicle for returning said signal to non-indicating condition when the vehicle has traveled a predetermined distance.

2. In a vehicle indicator a vehicle, signals thereon for indicating right and left hand turns of the vehicle, a source of electric current for said signals, means for operating said signals for indicating a change of direction, and means connected with the running gear of the vehicle for discontinuing said signals when the vehicle has travelled a predetermined distance.

3. A direction indicator including separate signals for indicating right and left hand turns of a vehicle, a source of electric current connected therewith, means for selectively energizing said signal at will, and mechanical means operatively connected with the running gear of the vehicle for discontinuing the energization of the signals when the vehicle has traveled a predetermined distance.

4. A direction indicator including separate signals for indicating right and left hand turns of a vehicle, a source of electric current connected therewith, means for selectively energizing said signals at will, and a mechanical device connected with the running gear of the vehicle, for automatically de-energizing said signals when the vehicle has traveled a predetermined distance.

5. A direction indicator for an automobile having a mechanical device operatively connected with the running gear thereof, separate signals for indicating right and left hand turns of the vehicle, a battery for supplying electric current to said signals, electrical connections between said battery and said signals, means for selectively energizing said signals at will, and for rendering said mechanical device operative, and means included in said mechanical device for automatically deenergizing said signals when the automobile has traveled a predetermined distance.

6. A direction indicator for an automobile including a mechanical device operatively connected with the running gear thereof, separate signals for indicating changes in direction of the vehicle, electrically connected for selective operation, means for initially energizing said signals, and means operatively connected with said signals and with said mechanical device for discontinuing the energization of the signals when the vehicle has traveled a predetermined distance.

7. A direction indicator including separate signals for indicating right and left hand turns of the vehicle, and electrically connected together, a source of electric energy therefor, means for initially energizing said signals preparatory to a change of direction, a mechanical device operatively connected with the running gear of the vehicle, an electro-magnet for each of said signals for rendering said mechanical device operative when said signals are energized, and means operatively connected with said mechanical device and with said signals for de-energizing said signals and said magnets when the vehicle has traveled a predetermined distance.

8. An electric signalling system for automobiles including separate signals for indicating right and left hand turns of the vehicle, a rotatable member operatively connected with the running gear of the vehicle, a train of reduction gearing normally inoperative and disconnected from said rotatable member, electromagnetic means for operatively connecting said gearing with said rotatable member when either of said signals are energized, and a rotatable member operated by said gearing for opening the circuit of said signals when the vehicle has traveled a predetermined distance, for de-energizing the signals and magnets.

9. An electrical signalling system for automobiles including separate signals for indicating right and left hand turns of the vehicle, a separate circuit for each of said signals, an electro-magnet connected in series with each of said circuits, branch circuits including the armature of said magnets, and manually operable switches, a normally closed control switch common to both of said circuits, a continuously rotatable driving member connected with the running gear of the vehicle, a normally inoperative mechanical device for operation thereby, said magnet serving to operatively connect said mechanical device with said driving member when either of said magnets are energized, and means controlled by said mechanical device for opening said control switch when the driving member has made a predetermined number of revolutions, for de-energizing the signals.

10. An electrical signalling system for automobiles including separate signals for indicating right and left hand turns of the vehicle, separate circuits for said signals, an electro-magnet in series with each of said circuits, means for selectively closing one of said circuits for initially energizing the corresponding magnet, and signal, and means rendered operative by the energization of either of said magnets for opening the signal circuits when a predetermined distance has been traveled by the vehicle, for de-energizing said signals.

11. An electrical indicating system for automobiles including a right hand turning signal and an electro-magnet connected therewith, a left hand turning signal and an electro magnet also connected therewith, a source of electric energy, an electric circuit including said source of energy, said signals and said magnets, a common connection between one side of said circuit and said signals, a control switch connected with the opposite side of said circuit, a pivoted bar adjacent each of said magnets, an armature carried on each of said bars for attraction by said magnets, a switch at each of the ends of each of said bars, a common connection between the corresponding ends of said bars and said control switch, right and left hand switches connected, respectively, with the other ends of said bars, whereby when said right and left hand switches are closed said magnets will be energized for attracting said armature, and means including said control switch and said electro-magnet for de-energizing said signal when the vehicle has traveled a predetermined distance.

12. An electrical indicating system for automobiles including separate signals for indicating right and left hand turns of the vehicle, an electro-magnet connected in series with each of said signals, a source of electric energy, a circuit including said source of energy, said signals and said magnet, a common connection between one side of said circuit and said signals, a control switch connected with the other side of said circuit, a driving member operatively connected with the running gear of a vehicle, a driven mechanism normally disconnected therefrom and operatively connected with the armatures of said magnets, right and left hand switches connected, respectively, with said signals whereby when the signal circuits are closed said magnets will be energized for attracting said armatures and rendering said driven mechanism operative, and means controlled by said driven mechanism for opening said control switch when said driving member has made a predetermined number of revolutions.

13. An electrical indicating system for automobiles including separate signals for indicating right and left hand turns of the vehicle, an electro-magnet connected in series with each of said signals, a source of electric energy, a circuit including said source of energy, said signals and said magnet, a common connection between one side of said circuit and said signals, a control switch connected with the other side of said circuit, a driving member operatively connected with the running gear of a vehicle, a driven mechanism normally disconnected therefrom and operatively connected with the armatures of said magnets, right and left hand switches connected, respectively, with said signals whereby when the signal circuits are closed said magnets will be energized for attracting said armatures and rendering said driven mechanism operative, a rotatable member operatively connected with said driven mechanism for opening said control switch for de-energizing said signals and said magnets when the said driving member has made a predetermined number of revolutions.

14. An electrical indicating system for automobiles including separate signals for indicating right and left hand turns of the vehicle, an electro-magnet connected in series with each of said signals, a source of electric energy, a circuit including said source of energy, said signals and said magnet, a common connection between one side of said circuit and said signals, a control switch connected with the other side of said circuit, a driving member operatively connected with the running gear of the vehicle, a driven mechanism normally disconnected therefrom and operatively connected with the armatures of said magnets, right and left hand switches connected, respectively, with said signals whereby when the signal circuits are closed said magnets will be energized for attracting said armatures and rendering said driven mechanism operative, a rotatable member operatively connected with said driven mechanism for opening said control switch for de-energizing said signals and said magnets when the said driving member had made a predetermined number of revolutions, and a manually operable release switch connected with said control switch.

RALPH BENNETT.

Witnesses:
 LUTHER L. MACK,
 IRENE BREEN.